United States Patent
Howell

[15] 3,707,002
[45] Dec. 19, 1972

[54] PLOTTING APPARATUS FOR USE IN CONJUNCTION WITH SURVEYING INSTRUMENTS

[72] Inventor: Mark I. Howell, Bristol, England

[73] Assignee: Electrolocation Limited, Bristol, England

[22] Filed: July 28, 1970

[21] Appl. No.: 58,791

[30] Foreign Application Priority Data

Aug. 4, 1969 Great Britain............38,867/69

[52] U.S. Cl.............346/33 M, 346/103, 346/141
[51] Int. Cl...................................G01d 9/38
[58] Field of Search.....346/33 R, 33 B, 103, 79, 141, 346/33 M

[56] References Cited

UNITED STATES PATENTS

| | | |
|---|---|---|
| 2,035,825 | 3/1936 | Muller.................178/5 |
| 3,293,654 | 12/1966 | Hausser...............346/105 |
| 3,149,902 | 9/1964 | Dransfield............346/33 X |
| 3,344,395 | 9/1967 | Silverman et al......346/33 X |
| 3,503,689 | 3/1970 | Miller et al..........346/33 X |
| 3,543,279 | 11/1970 | Remper et al.........346/141 |

Primary Examiner—Joseph W. Hartary
Attorney—Young and Thompson

[57] ABSTRACT

Plotting apparatus for producing a plot or chart of the signals recorded by a surveying instrument which is traversed over the ground and produces electrical signals which vary in accordance with the electromagnetic reflection coefficient of the ground, comprising means for playing back a recording of the signal, a solenoid-operated pen arranged to mark dots on a sheet secured on a carrier with a frequency dependent on the magnitude of the signal, and means for moving the pen and the sheet carrier relative to one another correspondingly to the traversing movement of the instrument over the ground. The pen may be mounted on a carriage which is shifted laterally in steps while the sheet carrier may be a drum which is rotated slowly so long as the recording is being played back.

4 Claims, 5 Drawing Figures

PLOTTING APPARATUS FOR USE IN CONJUNCTION WITH SURVEYING INSTRUMENTS

This invention relates to plotting apparatus for use in conjunction with surveying instruments which are traversed over the ground and produce varying electrical signals, e.g. in accordance with variations in the electromagnetic reflection coefficient of the ground. Such instruments are described and claimed in British Patent specification No. 1,087,216 and in the Specification of my co-pending British application Ser. No. 44175/69. It is an object of the present invention to provide a plotting apparatus which will produce a readily comprehensible two-dimensioned representation of the results of a survey of a piece of ground, carried out with such a surveying instrument.

According to the invention, a plotting apparatus, for use in conjunction with a surveying instrument which is traversed over the ground and produces a varying electrical signal, comprises means for playing back a recording of the signal from the instrument to produce a varying output signal, a marking device adapted to produce a marking on a sheet secured on an adjacent sheet carrier, means controlled by the output signal arranged to actuate the marking device to produce a marking whose intensity is dependent on the strength of the output signal, and means for causing relative movement between the marking device and the sheet carrier corresponding to the tranversing movement of the surveying instrument over the ground. Preferably the marking device comprises a pen movable by a solenoid to mark dots on the sheet. The means controlled by the output signal may comprise a pulse generator arranged to supply pulses to the pen solenoid at a repetition rate dependent on the level of the output signal. The pen may be mounted on a carriage movable in a direction parallel to the length of the paper carrier, and the means for causing relative movement may then include an electric motor for causing the carriage to move in steps in the said direction, corresponding to the spacing between consecutive traverses over the ground.

The sheet carrier may be a drum mounted for rotation about its own axis and arranged to be driven by an electric motor.

Alternatively the sheet carrier may be a stationary flat bed, the marking device being mounted for movement in two directions at right angles over the sheet, one of said movements being continuous but reversing at intervals and the other being stepwise.

The invention may be performed in various ways and one embodiment will now be described in more detail by way of example and with reference to the accompanying drawings, in which.

The embodiment now to be described produces a two-dimensional representation on paper, in dot-density form, of variations in soil conductivity and soil magnetic viscosity of an area of ground surveyed by means of the apparatus of British Pat. No. 1,087,216 or of Patent application Ser. No. 44175/69. The surveying instrument is traversed over the area to be surveyed while radiating a signal of, say, 4KHz and produces an output voltage which is proportional to the electromagnetic reflection coefficient of the underlying soil material. Buried objects such as metallic and non-metallic pipes, concrete cesspits and former excavations for foundations and trenching, all give rise to changes of the reflection coefficient of surface and subsurface soil.

The output from the surveying instrument is recorded on a twin-track portable tape recorder as the instrument is traversed in regular straight lines at constant speed, across the area to be surveyed. The tape recorder is started as each traverse starts and is stopped as the traverse ends. Thus the signals from the instrument recording the reflection coefficients are stored on one track of the tape in the form of a series of strips of varying signal intensity. The second track has impressed on it a constant signal or tone whenever the motor of the tape recorder is energized, i.e. during each traverse. This constant signal or tone may be the 4KHz signal emitted by the surveying instrument or a separately generated signal of, say, 1 KHz.

Figure 1:
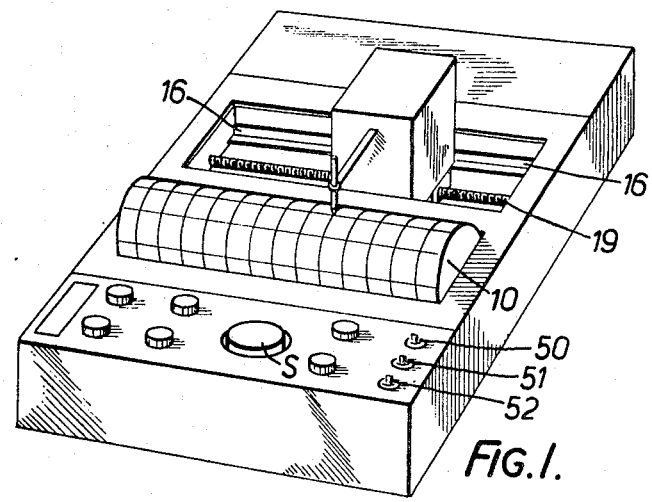
FIG. 1 is a perspective view of the plotting apparatus.
Figure 3:
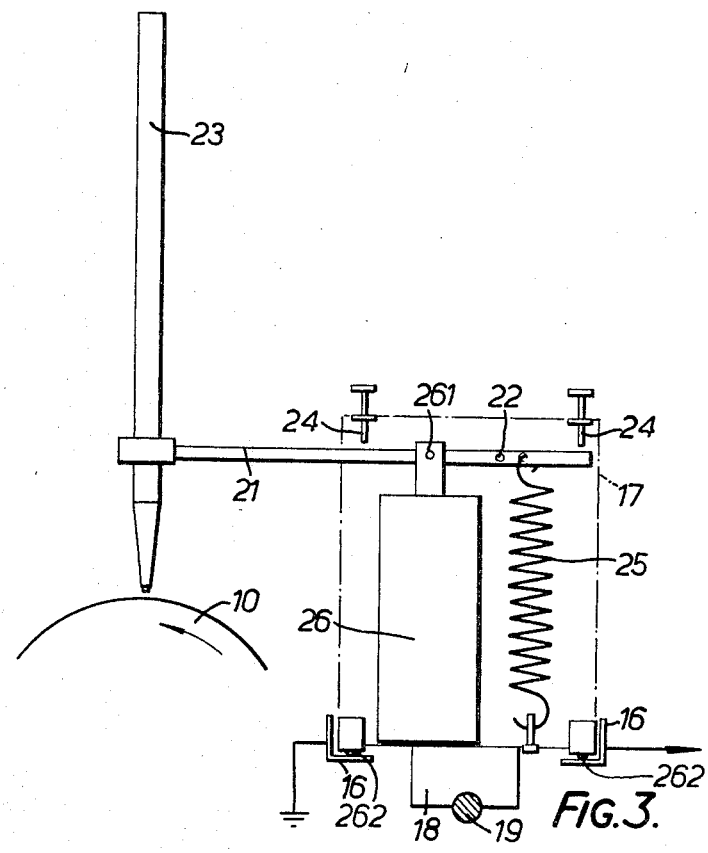
FIG. 3 is a diagrammatic elevation of the pen carriage.
Figure 2:
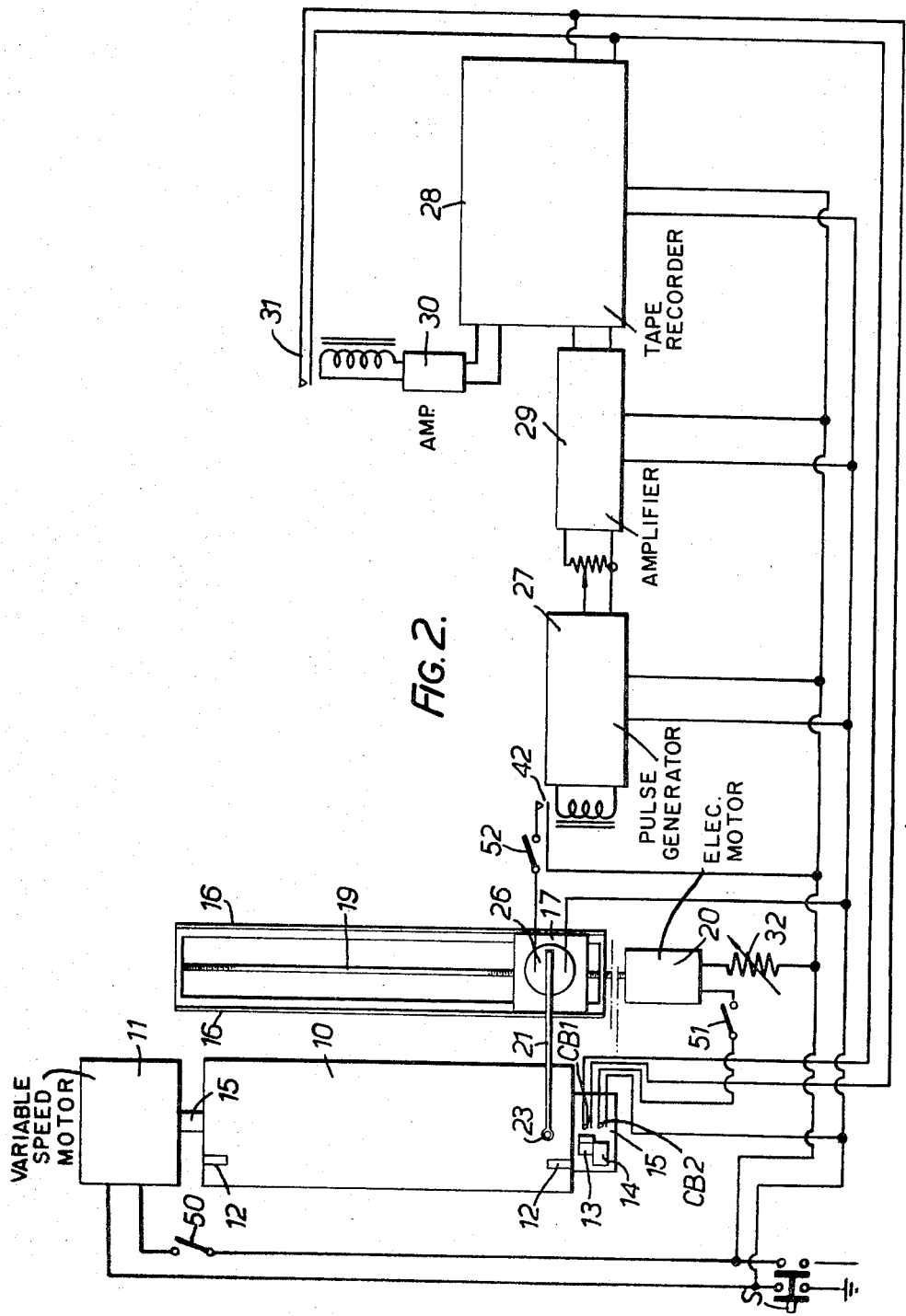
FIG. 2 is a diagrammatic layout of the mechanical and electrical components of the apparatus.

The plotting apparatus comprises a drum 10 rotated by a stabilized variable speed motor 11 (FIG. 2) at preset speeds of between one-fourth and 10 revolutions per minute. A main switch S is provided to close the main supply circuit while a manual switch 50 controls the circuit to the drum motor 11. Means such as the spring tabs 12 shown in FIG. 2 are provided for attaching a sheet of ink absorbent paper to the cylindrical surface of the drum 10. A pair of contact breakers CB1 and CB2 are mounted adjacent one end of the drum and arranged to be actuated by a pair of cams 13, 14 secured to the drum shaft 15.

Alongside the drum 10 is a pair of rails 16 on which is mounted a pen carriage 17, in the base of which is a block 18 of nylon having a semi-cylindrical threaded recess in its undersurface which engages with a rotatable threaded rod 19. The rod 19 is arranged to be driven by an electric motor 20 so as to traverse the pen carriage 17 along the rails 16 parallel to the drum 10. A manual switch 51 and a contact breaker CB2 control the current supply to the motor 20, as described below.

A substantially horizontal arm 21 is pivoted on the pen carriage 17 at 22 and carries a refillable fiber-tipped pen 23 at one end. The tip of the pen 23 is thus suspended closely above the paper on the drum 10. Movement of the pen arm 21 about the pivot 22 is restricted by adjustable stops 24 mounted on the carriage 17. A tension coil spring 25 attached at its lower end to the carriage 17 and at its upper end to the arm 21 on the side of the pivot 22 remote from the pen 23 normally holds the pen 23 out of contact with the paper on the drum 10. A solenoid 26 also mounted on the carriage 17 has its armature connected at 261 to the arm 21 on the same side of the pivot 22 as the pen 23, so that energization of the solenoid causes the pen 23 to make contact with the paper and print a dot thereon. Electrical connections to the solenoid 26 are made through carbon brushes 262 in contact with the rails 16, one of which is earthed while the other is connected through a manual switch 52 to the output of a pulse generator circuit 27.

The pen solenoid 26 is supplied with pulses of current of approximately 25 milliseconds duration from the pulse generator circuit 27 (FIGS. 2 and 4), at a frequency which depends on the amplitude of the signal voltage produced from the first track of the tape. The tape carrying the recording made by the surveying instrument is played back on a tape recorder 28 (FIG. 2). The tape signal from the first track is supplied to an amplifier 29 and thence to the input of the pulse generator 27. The output from the second track (the constant tone) is supplied through an amplifier 30 to a relay 31.

To start operation the manual switches 50, 51, 52 are closed and then the main switch S is closed to start the drum motor 11. The cam 13 closes contact-breaker CB1 momentarily to energize the motor driving the tape recorder 28. When the tape commences to move, the constant tone recorded in the second track energizes the relay 31 which closes a contact in the tape recorder motor circuit so that the tape recorder will continue to run even though the cam 13 now allows the contact breaker CB1 to open. The varying signal recorded on the first track causes the pulse generator 27 to produce pulses at a corresponding varying rate and hence causes the pen 23 to produce dots on the paper at intervals which depend on the intensity of the signal. As the drum 10 rotates, a line of dots at varying intervals is thus produced across the paper. When the tape reaches the end of the recording of a traverse, the constant tone ceases and relay 31 opens the circuit to stop the tape recorder motor. As the drum 10 completes its revolution, the cam 14 closes contact breaker CB2 which causes the carriage drive motor 20 to run so as to shift the carriage 17 along the rails 16 for a distance which depends upon the setting of a variable resistor 32 and is set to provide an appropriate spacing between adjacent lines of dots on the paper.

The pen carriage 17 stops moving as the cam 14 causes contact breaker CB2 to open again. The cam 13 then closes contact breaker CB1 causing the tape recorder motor to restart and the whole sequence is repeated to reproduce the second traverse, and so on to the end of the tape.

Figure 4:
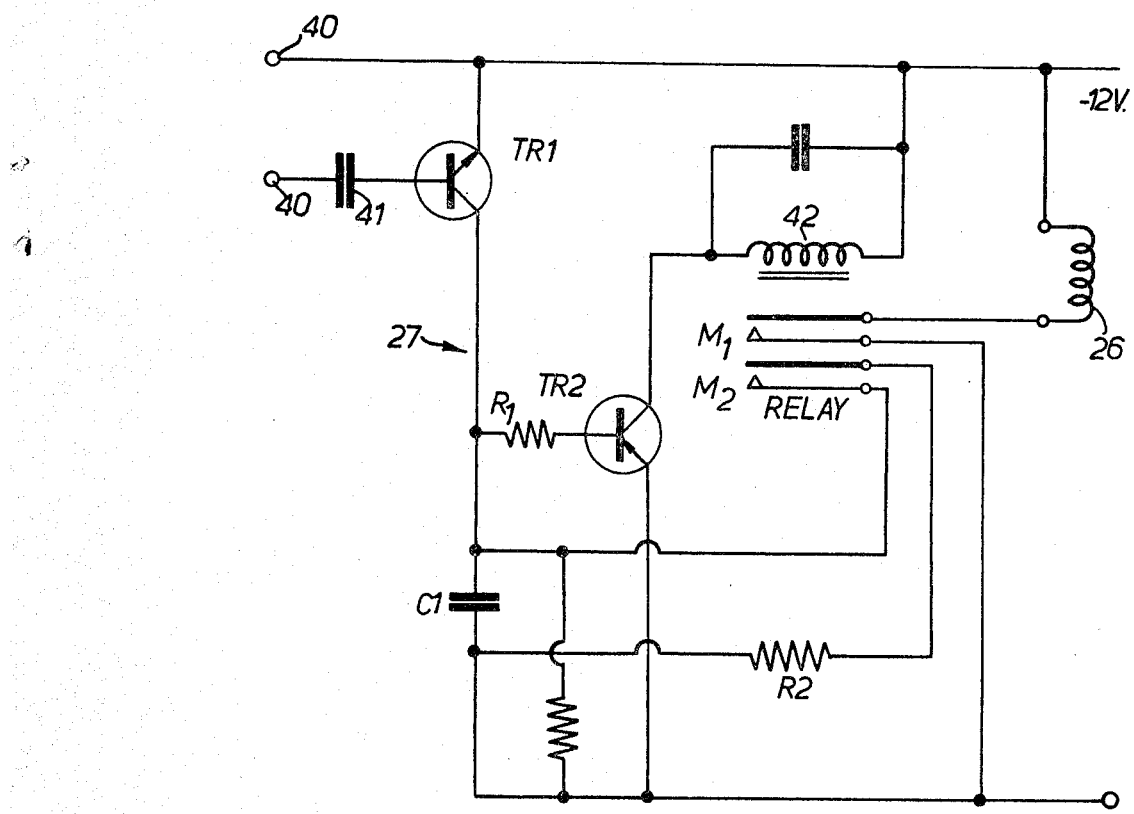
FIG. 4 is a circuit diagram of the pen pulse generator.
Figure 5:
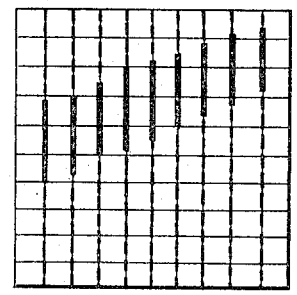
FIG. 5 is a representation of a typical plot.

One form of pulse generator circuit 27 is shown in FIG. 4. The signal from the first track of the tape is fed across terminals 40 and applied through a capacitor 41 to the base of a transistor TR1, whose conductivity accordingly varies with the signal. A capacitor C1 is negatively charged through transistor TR1 at a rate which depends upon the conductivity of the latter. The negative charge on capacitor C1 is applied through a resistor R1 to the base of a second transistor TR2. When this negative charge reaches a predetermined value it causes transistor TR2 to conduct so as to energize a relay 42 and thereby close contacts M1 and M2. Contacts M1 are in series with the pen solenoid 26 so that the pen 23 is actuated to produce a dot on the paper. Contacts M2 are connected across the two sides of the capacitor C1 through a resistor R2 so that one effect of energizing the relay 42 is that the negative charge on the capacitor C1 is rapidly reduced to zero. The negative bias on the base of transistor TR2 thus disappears and TR2 ceases to conduct, so that the relay 42 is de-energized and the contacts M1 and M2 separate again. The pulse produced in the pen solenoid circuit is of approximately 25 milliseconds duration.

At the end of the recording, the paper on the drum 10 may have any number of traverses, up to say 60 or 80, of dotted lines drawn across it, the intensity of the dotting corresponding to the intensity of the reflection coefficient of the ground surveyed. The plot thus produced is rather similar to a coarse newspaper photograph. In some cases it may be advantageous to produce two lines on the paper for each traverse so as to improve the effective contrast on the paper.

The contrast can also be varied by altering the gain of the amplifier 29, e.g. by varying the bias on one of its stages, so that a given change in the signal representing the reflection coefficient produces a greater or lesser change in the frequency of the pulses supplied by the circuit 27 to the pen solenoid 26.

Instead of using a rotary drum 10 as a paper carrier, the paper may be supported on a stationary flat bed and the pen caused to move in two directions at right angles over it, one movement being continuous but reversed at intervals, representing movement along succeeding traverses, and one being stepwise, representing movement from one line of traverse to the next.

I claim:

1. A plotting apparatus, for use in conjunction with a surveying instrument which is traversed over the ground and produces a varying electrical signal, comprising means for playing back a recording of the signal from the instrument to produce a varying output signal, a drum sheet carrier mounted for rotation about its own axis, a first electric motor for driving the drum, a marking device adapted to produce a marking on a sheet secured around said drum, a carriage movable in a direction parallel to the axis of the drum, and carrying said marking device, a second electric motor for driving the carriage, variable pulse generator means controlled by the output signal and arranged to supply pulses of a frequency dependent on the strength of the output signal to actuate the marking device to produce marks at a corresponding rate, a shaft which rotates with the drum carrying a first cam which is arranged to close a first contact-beaker to energize the carriage-driving electric motor and thereby to cause the carriage to move one step each time the drum completes a revolution, and a second cam which is arranged to close a second contact-breaker momentarily at the beginning of each revolution of the drum to trigger operation of the play back means, the play back means being adapted to produce a tone as well as the recorded signal, and a relay responsive to said tone to maintain operation of the play back means so long as the recording of a traverse is being played back.

2. A plotting apparatus according to claim 1, wherein the marking device comprises a pen movable by a solenoid to mark dots on the sheet.

3. A plotting apparatus according to claim 2, wherein the pulse generator comprises a transistor whose conductivity is varied in accordance with the level of the output signal, and which is connected so as to control the rate of charging of a capacitor.

4. A plotting apparatus according to claim 3, wherein a second transistor is arranged so as to become conductive each time the charge on the capacitor reaches a predetermined value, and thereby to energize a relay to close the circuit to the pen solenoid.

* * * * *